United States Patent Office 3,729,433
Patented Apr. 24, 1973

3,729,433
METHOD OF PREPARING POLYARYLENE POLYMERS WITH ALKYL AMINO AROMATICS, COMPOSITIONS THEREOF AND PRODUCTS
Norman Bilow, Los Angeles, and Abraham L. Landis, Northridge, Calif., assignors to Hughes Aircraft Company, Culver City, Calif.
No Drawing. Continuation of application Ser. No. 785,013, Dec. 5, 1968. This application Sept. 2, 1971, Ser. No. 177,905
Int. Cl. C08f 1/76
U.S. Cl. 260—2 H                    11 Claims

ABSTRACT OF THE DISCLOSURE

This disclosure describes a method of providing self-curing and cured hydroxylated or nonhydroxylated polyaromatics or polyarylenes such as polyphenylenes, polyphenolphenylenes, polyphenylsilanes, and polyphenylethers, and mixtures thereof which are prepared from corresponding aromatic hydrocarbons or mixtures of phenols with such aromatic hydrocarbons and aromatic Mannich bases using a strong protonic or non-protonic acid, for example, strong Lewis acid catalysts. The cured polymers exhibit improved adhesion characteristics, and provide compositions with improved strength. The disclosure more particularly describes the method of preparation of improved curable and cured products, of said polyaromatic polymers partially cured and the curing thereof with armoatic Mannich bases of poly[α-(dialkylaminomethyl)]phenyl, or homologous biphenyl, terphenyl or phenol derivatives, isomers of same, and mixtures thereof, with an acid material.

This is a continuation of application Ser. No. 785,013, filed on Dec. 5, 1968 and now abandoned.

The invention herein described was made in the course of or under a contract or subcontract thereunder, with the Air Force.

BACKGROUND OF THE INVENTION

Non-curable polyphenyl silanes are known to the art. Recently, soluble, fusible polyphenylenes in a molecular weight range of 1000±500 to about 3000 have been prepared by oxidative cationic polymerization of monomers as biphenyl, terphenyls, quaterphenyls (other than per se para quaterphenyl) isomers thereof, anthracene, phenanthrene, naphthalene and mixtures thereof. Included by reference thereto are such application matters as applications Ser. No. 665,262 now abandoned and 665,267 now U.S. Pat. 3,578,611, of Norman Bilow and Leroy J. Miller; application Ser. No. 665,264 now abandoned of Norman Bilow, and Ser. No. 665,266, now U.S. Pat. 3,582,498, of Norman Bilow and John B. Rust, showing of the production of soluble and fusible polyphenylenes and modification thereof as provided therein, and such polyphenylenes and modifications thereof are included herein and curable hereby.

To make these polyphenylene and phenylsilane polymers more useful, particularly under high temperature and ablative conditions, they must be cured into more adherent resinous forms. The curing agents found most effectively reactive with the polyphenylenes were preferably a reactive telomeric intermediate derived from an aromatic carbinol as p-xylene glycol and p-toluenesulfonic acid, or aromatic sulfonyl chlorides. These curing agents, applicable to curing by heat or heat and pressure, effected the production of cured resins and particularly polyphenylene resins which possess no functional reactive groups providing relatively inert substrates of a low order of adhesion to other surfaces.

SUMMARY OF THE INVENTION

According to this invention, there is disclosed and illustrated the best mode contemplated for a method of preparing and curing compositions of soluble, fusible polyphenylene polymers, polyphenolphenylene polymers, polyphenylsilane polymers, and polyphenyl ether polymers, and mixtures thereof, with poly[α-(dialkylaminomethyl)]benzene, poly[α-(dialkylaminomethyl)]phenol, poly[α-(dialkylaminomethyl)]biphenyls, poly[α-(dialkylaminomethyl)]terphenyl, or poly[α-(dialkylaminomethyl)]quaterphenyls, and mixtures of the same and especially the dialkylaminomethyl homologues of these compounds, prepared from corresponding aromatic-alkyl compounds and using therewith strong protonic or non-protonic acids or substituted acid derivatives and mixtures of such acids, as catalysts. Such materials and mixtures thereof, as contemplated and disclosed herein, are initially solvent soluble in coating solutions and are self-setting or thermosetting to provide hard, infusible, insoluble, encasement material, or thermally stable resins useful as coatings, or pottable, castable, and moldable structural compositions, with or without the addition of material modification, as herein provided. More particularly, the non-hydroxy or non-phenolic polyaromatics as polyphenylenes, polyphenylsilanes and polyphenylethers, including mixtures thereof, and mixtures of same with from 1% to about 80% other modifying or modified and unmodified homogeneous resin forming complexes, as alkyl or aryl modified or unmodified vinyl polymers, polyalkylene polymers as polyethylene and the like, aliphatic and aromatic epoxy polymers with or without internal and/or external oxirane groups, cellulosic polymers and the esters and salts thereof, natural and synthetic rubber polymers, natural and other synthetic thermoplastic and thermosetting polymers as phenolic and modified phenolic polymers, natural and sythetic asphaltic materials as tars and tarry residues, and mixtures of such materials with said polyphenylene, polyphenolphenylene, polyphenylethers and/or polyphenyl silane polymers, including mixtures of the polyphenyl polymers, are cured with aromatic Mannich bases prepared from alkylamino substituted benzene, biphenyl, terphenyls, or phenols, as provided herein. Alkylamino derivatives of aryl phenols, alkyl phenols, bisphenol A, p,p' - dihydroxydiphenyl oxide, p,p'dihydroxydiphenylmethane, or other short chain alkyl or aryl substituted homologues, including p,p' - dihydroxy diphenylsulfide, p,p'-dihydroxydiphenylsulfoxide, and the trihydroxy homologues of these compounds, provide aromatic Mannich bases useful in combination with a strong Lewis acid catalyst material as zinc chloride, hydrochloric acid, boron trifluoride, or other suitable strong Lewis acids, and mixtures of the same, including aromatic sulfonic acid derivatives, to serve as curing agents for the prepared polymers of polyphenylenes, including polyphenolphenylenes, polyphenylsilanes, polyphenylethers, mixtures of the same, and modified or modifying compositions thereof as indicated herein.

3

Specific embodiments illustrating the manner and process of the best modes contemplated for making and using the invention are described as follows:

DESCRIPTION OF THE AMINATED PHENOL PREPARATION

In a typical case, phenols can be reacted with diethylamine and formaldehyde to yield aromatic Mannich bases such as illustrated below:

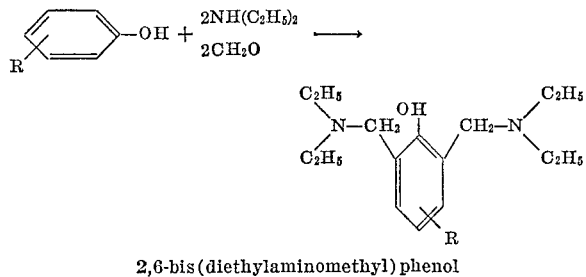

2,6-bis(diethylaminomethyl) phenol where: R=alkyl, aryl, alkaryl, aralkyl, hydrogen, halogen, alkoxy, aryloxy.

EXAMPLE 1

A typical preparation of the curing agent involves the reaction of o,o'-diphenol with morpholine and formaldehyde according to the following reaction:

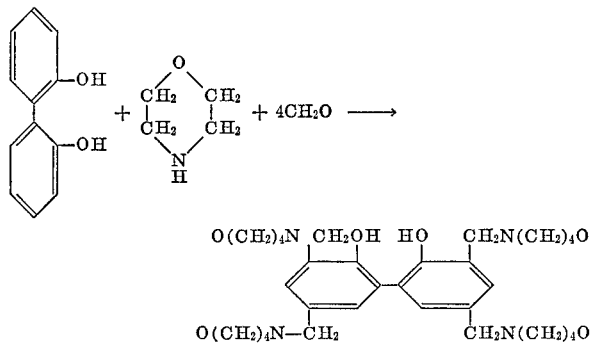

Thus, into a 3-neck one-liter round-bottom flask fitted with a stirrer, heating mantle, thermometer, reflux condenser and addition funnel are added o,o,'-diphenol (62 g., 0.33 mole) and morpholine (132 g., 1.52 mole). Then formaldehyde (37% solution, 13 ml.) was added dropwise maintaining the temperature no higher than 35–45° C. After the addition, the reaction mixture was kept at 85–90° C. for one hour. The volatile constituents were then removed by vacuum distillation using the water aspirator as the vacuum source and a steam bath as the heat source. The crude product was obtained in 76% yield and could be recrystallized from an ethylacetatehexane mixture to yield crystals melting at 144–146° C.

EXAMPLE 2

In the synthesis performed in a similar manner, p,p'-biphenol was substituted for the o,o'-biphenol to yield a product which when recrystalized from ethyl acetate had a M.P. of 173–176% C.

Substitution of alkyl amines other than morpholine yields aminated phenols in a manner analogous to those described above. Typical primary and secondary amines which may be used are ethylamine, propylamine, dimethylamine, diethylamine, dipropylamine, methyl-ethylamine and diisopropylamine. Aromatic amines such as aniline or N-methylaniline may also be used but are less desirable because they react slower and produce high boiling outgas products.

Curing can be effected by mixing the polyphenylene or other polyarylene material, as described, with the aromatic Mannich base material in ratios of from at least 10% to not more than 60% curing agent and about 1–10% acid combination. For example, a curing agent such as 2,6 - bis(diethylaminomethyl) - 4-methylphenol and an acid catalyst therefor, for example, a Lewis acid catalyst such as zinc chloride, sulfuric acid, aluminum chloride, hydrochloric acid, mixtures of zinc chloride and aluminum chloride with or without boron trifluoride, can be mixed in the dry or liquid state, in reactant proportions, and in the preferred range of 1% to 10% acid to the aromatic Mannich base, and heating the mixture in a mold under pressure. Otherwise, the composition in liquid (solution form), with or without modification, as contemplated, may be applied and used as an impregnate or lacquer, applied by conventional processing.

EXAMPLE 3

A mixture of 1.0 g. of 2,6-bis(diethylaminomethyl)-4-methyl-phenol and zinc chloride (0.1–0.3 g.) is heated to a clear melt. The melt is heated with thorough stirring until polymerization, which is accompanied by an increase in viscosity, has proceeded to the desired extent. The product is then dissolved in a solvent such as hot chlorobenzene (20 ml.). This solution is then mixed with a chlorobenzene solution of a soluble polyphenylene (10 grams M.W. 1000±500 to about 2500) and the mixture is heated under reflux to a point just before solids start to precipitate.

The solvent is then removed by vacuum distillation and the residue ground and placed in a mold, compressed and cured by heating at approximately 400° F. for three hours under 300–700 p.s.i. The object is cooled under pressure, removed from the mold, and postcured in an oven in which the temperature is slowly raised to 600° F. After curing, the molded object was subjected to higher temperatures in an inert atmosphere in the range of 600° F. to 1000° F. without apparent damage.

Preparation of curable and cured modified or unmodified solublue, fusible, polyphenylene, polyphenyleneether, and/or polyphenylsilane resins with the herein described curing components are exemplified as follows:

EXAMPLE 4

A solution consisting of polyphenylene resin (10.0 g., chlorobenzene soluble), N,N,N',N'-tetraethyl-p-xylene-α,α'-diamine (5.0 g.), p-toluene sulfonic acid monohydrate (2.5 g.) in 125 ml. of chlorobenzene was refluxed for 72 hours. The solvent was removed under vacuum using a rotafilm evaporator to yield a moldable resin which slowly cured in air at 250–300° C. In the solvent form, the solution is applicable as an impregnate and lacquer. For more rapid cure, the applied impregnate, coating, or molded compositions can be heated above 300° C., as indicated.

EXAMPLE 5

A solution consisting of polyphenylene resin (5.0 g., chlorobenzene soluble), N,N,N',N'-tetraethyl-p-xylene-α,α'-diamine (2.5 g.), boron trifluoride etherate solution (2 ml., 48% conc.) in 80 ml. of chlorobenzene was heated at reflux for 18 hours. While applicable as a lacquer or impregnate in suitable solvent, the solvent was removed under vacuum using a rotafilm evaporator to yield a moldable resin which slowly cured in air at 250–300° C.

By application of additional heat, on the order of 300°–350° C., the resin product cured more rapidly.

EXAMPLE 6

A mixture of triphenyl biphenylyl silane (2.0 g.) and anhydrous zinc chloride (0.2 g.) in trichlorobenzene was heated until solution was effected. Then N,N,N',N'-tetraethyl-α,α'-diamino-p-xylene (2.0 g.) was added and the mixture was heated at reflux for about 20 hours. At the end of this time, the solvent was removed, the dry product was ground to provide a fusible molding composition which provided a molded resinous product when formed in a mold and heated on the order of 300° F.

Other like preparations heated at reflux for a period of several to about 20 hours and while still in the apparently homogeneous liquid stage provided resinous compositions useful as coating and impregnating lacquer solutions. In addition, the composite resin, in the uncured state, was soluble in suitable organic solvent material, as chlorobenzene, tetrachloroethane, trichloroethylene, toluene, and chloroform, and other suitable solvents providing self-curing and heat-curable coating and impregnating solutions. Such soluble silane and polyphenylene solutions as herein exemplified, were also compatible with conventional Epon and epoxy resinous materials, for example, of the character of soluble bisphenoldiglycidyl ether and epoxy-alkyd resin complexes and mixtures of the same.

In addition, the dried ground fusible products when mixed with synthetic rubbery and tarry thermoplastic polymers have been found to relatively alter their properties or the properties of the polyphenyl material are altered dependent upon the relative proportions of the mixture. The higher the portion of thermosetting polyphenyls the more hard and less thermoplastic the mixture becomes. Whereas, the higher the portion of thermoplastic material in admixture with the polyphenyls, the more they modify or plasticize the thermosetting polyphenyls, as herein described, contemplated and provided. Dependent upon the relative properties required, or desired, it is contemplated herein to provide such mixtures of the modified polyphenols, and modifying or modified additives, with or without inert filler material, as described and contemplated herein.

EXAMPLE 7

A sample of the dry powder preparation of Example 6 when mixed with a conventional epoxy compound in a mutual solvent (chloroform) provided a coating and impregnating solution which cured in air at 250° to 300° C. Dry mixtures of the same, in approximately equal proportions, formed pottable and moldable compositions upon heating and curing. Other mixtures prepared with fibers and fillers provided hard molded products from the dry or liquid states.

EXAMPLE 8

A mixture of triphenyl biphenylyl silane (2.0 g.), N,N,N',N' - tetraethyl - α,α'-diamino-p-xylylene (2.0 g.) and p-toluene sulfonic acid monohydrate (0.4 g.) was heated at reflux for several to about 20 hours and soluble, moldable self-curing and heat-curable resins were obtained. When heated at reflux for a period of 24 hours, a cured resinous product was obtained.

The soluble resin contained in a chloroform solvent on the order of about 10% solids was used to impregnate several conventional fabric plies which were laminated in a mold under pressure and cured at a temperature of about 350° C. to obtain a molded hard machinable laminated structure useful in the fabrication of structural elements.

EXAMPLE 9

Polyphenyleneoxide (10 g.) was dispersed in chlorobenzene (100 ml.) then N,N,N',N'-tetraethyl-α,α'-diamino-p-xylene (3 g.) and zinc chloride (0.5 g.) were added. The solvent was then removed by evaporation yielding a waxy-like polymer blend. This blend was found to cure to a hard resin when heated at 250° C. for an extended period of time.

Mineral fillers were incorporated into the paste-like chlorobenzene polymer suspensions prior to removal of the solvent. Filled resins were then cured under conventional conditions of heat and pressure to provide heat stable molded resinous compositions.

EXAMPLE 10

A copolymer of m-terphenyl and phenol was prepared by reacting 1 mole of m-terphenyl with phenol (1 mole), dry AlCl₃ (6 mole), and CuCl₂ (4 mole). The reaction was conducted without solvent at 100–120° C. When HCl evolution virtually ceased, the crude product was digested in concentrated HCl then water. After drying, the polymer was washed repeatedly with a mixture of benzene (20%) in naphtha. It was then extracted with chloroform to isolate the desired CHCl₃ soluble polymer fraction. Part of this fraction (20 g.) was dissolved in chlorobenzene and p-bis(dimethylaminomethyl)benzene (6 g.) and AlCl₃ (1 g.) were added to the solution. After dissolving, the lacquer was used to impregnate a sheet of woven glass fabric. This fabric was thoroughly dried. It was then cut into sections which were stacked and molded under conventional conditions of heat and pressure. The laminate was removed from the press when cured, providing a prefabricated machinable laminate.

EXAMPLE 11

Repeat Example 10 except replace p-bis(dimethylaminomethyl)benzene by 2,6 - bis(dimethylaminomethyl)-4-methylphenol.

In addition to the polyfunctional aminated phenolic or aromatic non-phenolic curing agents as illustrated above, there may be substituted in the foregoing composition and other compositions of polyphenylenes, polyphenolphenylenes, polyphenylsilanes, polyphenyl ethers, mixtures of the same and in admixture therewith other modifying or modified composition material, as indicated, such curing agent compound, or mixtures thereof, as those selected from the group consisting of non-sterically hindered amines as N,N,N',N'-tetramethyl-α,α'-diamino-xylylene,
2,6-bis(dimethylaminomethyl)phenol,
2,6-bis(dimethylaminomethyl)-4-methylphenol,
2,6-bis(dimethylaminomethyl)-4-phenylphenol,
tetrakis(dimethylaminomethyl)biphenol,
tris(dimethylaminomethyl)biphenol,
bis(dimethylaminomethyl)diphenylmethane,
tris(dimethylaminomethyl)diphenylmethane,
bis(dimethylaminomethyl)diphenyl oxide,
tris(dimethylaminomethyl)diphenyl oxide,
tetrakis(dimethylaminomethyl)diphenyl oxide,
tetrakis(dimethylaminomethyl)diphenylmethane,
bis(dimethylaminomethyl)terphenyl,
tris(dimethylaminomethyl)terphenyl,
bis(dimethylaminomethyl)biphenyl,
tris(dimethylaminomethyl)biphenyl, isomers thereof and homologues thereof wherein one or more of the methyl groups is replaced by ethyl, propyl or butyl or wherein one of the methyl groups on the amino nitrogen is replaced by hydrogen.

As embodied herein, compositions of thermoplastics as synthetic rubber-forming polymers, natural and synthetic tarry polymers and residues as pitches and tars and the like when mixed with the thermosetting polyphenylene polymers, polyphenylsilane polymers or polyphenylether polymers, and mixtures of the same provide thermosetting compositions. The relative proportions are self-determinable in accordance with the strength, hardness or plasticity desired for the particular application. For example, wet or dry mixtures of the prepared soluble compositions of Examples 3 thru 9, when mixed, in the dry or solvent state with other soluble natural or synthetic resinous material provides an unlimited number of new coating and molding materials. Illustrative of such compositions are the following:

EXAMPLE 12

A solution of soluble fusible branched polyphenylene (20 g.), polystyrene (5 g.), zinc chloride (1 g.) and 2,6-bis(dimethylaminomethyl)-4-phenylphenol (10 g.) was prepared using chlorobenzene as the solvent. The solvent was removed under vacuum to provide a dried thermosetting molding composition.

EXAMPLE 13

A solution of polyphenylene (20 g.), 2,6-bis(dimethylaminomethyl)-4-methylphenol (7 g.) and AlCl$_3$ (1 g.) in chlorobenzene was dried thoroughly. The isolated resin was then pulverized and thoroughly blended with pulverized alumina (8 g.). This blended composition was molded at 250° C. under pressure (1000 p.s.i.–5000 p.s.i.) to provide a hard cured composition.

Natural and/or synthetic fibers such as cotton, wool, nylon, and the like can be incorporated in the above mixtures. In addition, natural and/or synthetic filler materials as aggregate particulates can be incorporated in the mixtures embodied herein. To obtain an improved bonding between the polymers and the added solids thereto, it has been found that improved adherence can be obtained by first treating the fibers and/or particulate material with the curing agent or effecting an initial or subsequent reaction with the fibers and/or particulate in-situ therewith. The relative composites of admixture, for relative hardness, plasticity and strength of the composition mixtures are self-determinable for any particular application desired, as indicated.

Having exemplified and described the present embodiments of our discovery in accordance with the patent statutes, it will now be apparent that some modifications and variations including substitution of modified derivatives of the indicated polymers may be made without departing from the spirit and scope thereof. The specific embodiments described are provided by way of illustration and are illustrative of our discovery, invention or improvements which are to be limited only by the terms of the appended claims.

What is claimed is:

1. A polymerizable system comprising a polymer selected from the group consisting of soluble and fusible polyphenylenes of a molecular weight on the order of 500 to about 3000, polyphenylsilanes, phenolphenylene copolymers, polyphenyl ethers, and mixtures of the same, an aromatic dialkyl amino methyl Mannich base as curing agent and a strong Lewis acid as catalyst.

2. A composition of claim 1 wherein said Mannich base is selected from the group consisting of a poly(dialkylaminomethyl)benzene, poly(dialkylaminomethyl)phenol, poly(dialkylaminomethyl)biphenyl, poly(dialkylaminomethyl)terphenyl, poly(dialkylaminomethyl)quaterphenyl, and ethyl, propyl and butyl homologues thereof.

3. A composition of claim 1 containing cellulosic polymers as a modifier.

4. A thermoset polymer obtained by heat curing a composition comprising a compound selected from the group consisting of fusible and soluble polyphenylenes of a molecular weight on the order of 500 to about 3000, polyphenylsilanes, phenolphenylene copolymers, polyphenylethers, and mixtures of the same, an aromatic dialkylaminomethyl Mannich base as curing agent, and a strong Lewis acid as catalyst.

5. A thermoset polymer of claim 4 wherein said composition comprises polyphenylene polymers, from 10–60% by weight curing agent and about 1 to about 10% by weight Lewis acid.

6. A thermoset polymer of claim 5 wherein the curing agent is selected from the group consisting of a poly(dialkylaminomethyl)benzene,
poly(dialkylaminomethyl)phenol,
poly(dialkylaminomethyl)biphenyl,
poly(dialkylaminomethyl)terphenyl,
poly(dialkylaminomethyl)quaterphenyl, and mixtures of the same, and the heat curing is carried out at a temperature from about 300° F. to about 600° F.

7. A thermoset polymer of claim 4 wherein the curing agent is selected from the group consisting of tris(dimethylaminomethyl)phenol,
bis(dimethylaminomethyl)phenol,
bis(dimethylaminomethyl)methylphenol,
bis(dimethylaminomethyl)biphenol,
tetrakis(dimethylaminomethyl)biphenol,
tris(dimethylaminomethyl)biphenol,
bis(dimethylaminomethyl)phenylphenol,
bis(dimethylaminomethyl)diphenylmethane,
tris(dimethylaminomethyl)diphenylmethane,
bis(dimethylaminomethyl)diphenyl oxide,
tris(dimethylaminomethyl)diphenyl oxide,
tetrakis(dimethylaminomethyl)diphenyl oxide,
tetrakis(dimethylaminomethyl)diphenylmethane,
bis(dimethylaminomethyl)terphenyl,
tris(dimethylaminomethyl)terphenyl,
bis(dimethylaminomethyl)biphenyl,
tris(dimethylaminomethyl)biphenyl, isomers thereof and homologues thereof wherein a pendant methyl of a dimethylamino radical is replaced by ethyl, propyl, butyl, and mixtures of the same.

8. A thermoset polymer of claim 4 wherein the curing agent is selected from the group consisting of 2,4,6-tris(dimethylaminomethyl)phenol, 2,6 - bis(dimethylaminomethyl)-4-methylphenol, 2,6-bis(dimethylaminomethyl)-4-phenylphenol, p-bis(dimethylaminomethyl)benzene or homologues thereof wherein a pendant methyl of a dimethylamino radical is replaced by ethyl or propyl.

9. A thermoset polymer of claim 8 wherein the catalyst is selected from the group consisting of zinc chloride, boron trifluoride, hydrogen chloride, sulfuric acid, p-toluene sulfonic acid, aluminum chloride, and mixtures of said acid material.

10. A polymerizable system comprising polyphenylsilanes an aromatic dialkylaminomethyl Mannich base as curing agent, and a strong Lewis acid as catalyst.

11. A polymerizable system comprising soluble and fusible polyphenylenes of a molecular weight on the order of about 500 to about 3000, as curing agent, an aromatic Mannich base selected from the group consisting of poly(dialkylaminomethyl)benzene,
poly(dialkylaminomethyl)phenol,
poly(dialkylaminomethyl)biphenyl,
poly(dialkylaminomethyl)terphenyl,
poly(dialkylaminomethyl)quaterphenyl, and ethyl, propyl and butyl homologues thereof, and a strong Lewis acid as catalyst.

References Cited
UNITED STATES PATENTS 3,578,611  5/1971  Bilow et al. _____ 260—2

MAURICE J. WELSH, Primary Examiner

M. I. MARQUIS, Assistant Examiner

U.S. Cl. X.R.

260—2 S, 3, 9 R, 37 R, 47 R, 47 EP, 830 R, 838, 874